US008989656B2

(12) United States Patent
Bruce (10) Patent No.: US 8,989,656 B2
(45) Date of Patent: Mar. 24, 2015

(54) ANCHOR DATA COMMUNICATION SYSTEM

(75) Inventor: Peter Bruce, Isle of Man (GB)

(73) Assignee: Brupat Limited, Isle of Man ( * ) Notice: Subject to any disclaimer, the term of this patent is extended or adjusted under 35 U.S.C. 154(b) by 160 days.

(21) Appl. No.: 13/883,538

(22) PCT Filed: Nov. 3, 2011

(86) PCT No.: PCT/GB2011/052136
§ 371 (c)(1),
(2), (4) Date: May 3, 2013

(87) PCT Pub. No.: WO2012/059760
PCT Pub. Date: May 10, 2012

(65) Prior Publication Data
US 2013/0225069 A1     Aug. 29, 2013

(30) Foreign Application Priority Data

Nov. 5, 2010 (GB) .................................. 1018670.8

(51) Int. Cl.
*H04B 13/02* (2006.01)
*B63B 21/42* (2006.01)
*B63B 21/26* (2006.01)

(52) U.S. Cl.
CPC ............... *H04B 13/02* (2013.01); *B63B 21/42* (2013.01); *B63B 21/26* (2013.01); *B63B 2021/262* (2013.01)
USPC .............................................. 455/40; 455/39

(58) Field of Classification Search
USPC ......... 166/350, 352, 354; 441/23, 25; 455/40, 455/41.2, 39, 500; 340/500, 531, 539.1
See application file for complete search history.

(56) References Cited

U.S. PATENT DOCUMENTS

| | | | | |
|---|---|---|---|---|
| 5,691,957 A | * | 11/1997 | Spiesberger | 367/3 |
| 6,472,983 B1 | * | 10/2002 | Grunder | 340/540 |
| 7,034,680 B2 | * | 4/2006 | Grunder | 340/540 |
| 7,143,712 B1 | | 12/2006 | Naslund | |
| 2012/0188696 A1 | * | 7/2012 | Gildseth et al. | 361/679.01 |

FOREIGN PATENT DOCUMENTS

| | | | | |
|---|---|---|---|---|
| DE | 19703141 A1 | * | 7/1998 | B63B 21/22 |
| DE | 20021739 U1 | | 3/2001 | |
| WO | 2012059760 A1 | | 5/2012 | |

OTHER PUBLICATIONS

Kotouczek-Zeise, Alfred, Anchorage indication arrangement for ship or boat, DE 19703141 A1 (Google translation from German), pp. 1-3.*
International Search Authority, "Written Opinion," PCT/GB2011/052136, mailed May 5, 2013.
International Search Authority, "International Search Report," PCT/GB2011/052136, mailed May 10, 2012.

* cited by examiner

*Primary Examiner* — Sonny Trinh
(74) *Attorney, Agent, or Firm* — Benjamin A. Balser; Balser & Grell IP Law (57) ABSTRACT

An anchor data communication system (1) for communication of measurement data, provided by instrumentation (2) mounted on a marine anchor (3) buried below a surface (5) of a mooring bed (4), including a first transponder (10) mounted on a line member (7, 3D) attached to said anchor (3) and connected by conductor means (11) to said instrumentation (2), and a second transponder (12, 12A) mounted on said line member (7, 3D) or suspended from a floating structure (8, 21A) and connected to a transceiver (9, 9A) on said floating structure (8, 21A), wherein an axis (10A, 12B) of an emission beam (10B, 12C) of at least one of said transponders (10, 12, 12A) is constrained in heading by said line member (7, 3D) to maximize the strength of signals from said first transponder (10) arriving at said second transponder (12, 12A).

20 Claims, 4 Drawing Sheets

ANCHOR DATA COMMUNICATION SYSTEM

CROSS REFERENCE TO RELATED APPLICATIONS

This application claims priority to PCT application Ser. No. PCT/GB2011/052136 filed on Nov. 3, 2011; and to GB patent application Ser. No. 1018670.8, filed on Nov. 5, 2010, which are incorporated by reference herein.

Systems providing communication of data between instrumentation on a foundation structure buried in a mooring bed below a body of water and data receiving equipment on a structure floating in the body of water thereover are known.

European Patent EP 0 820 400 B3 discloses means for communicating data between instrumentation mounted on an anchor buried in a mooring bed and data receiving equipment on a floating vessel connected to the anchor by a mooring line. The disclosure includes a wholly electrical communication path and a combination of electrical and acoustic communication paths. The electrical communication path includes electrical conductors, incorporated within the mooring line, which connects the instrumentation on the anchor directly to the data receiving equipment on the floating vessel. The disclosed combination of electrical and acoustic communication paths comprises electrical conductors, trailable behind the anchor, which connect the instrumentation to an acoustic transponder arranged to lodge at the surface of the mooring bed, and an acoustic path from the transponder through the body of water to an acoustic transponder or receiver located on the floating vessel and connected (implicitly) by electrical conductors to the data receiving equipment.

Disadvantages of the disclosed wholly electrical path include: the high cost of incorporating electrical conductors within a long mooring line to provide protection against handling hazards; elongation problems for the electrical conductors when embedded in a synthetic rope which frequently forms part of a mooring line; and vulnerability to damage of the conductors at external connections between mooring line segments where such connections are prone to being crushed between the mooring line and the surface of the stern roller of an anchor handling vessel typically used for installation and recovery of the mooring line.

Disadvantages of the disclosed combined electrical and acoustic paths include: muffling of the acoustic transponder by soil due to the acoustic transponder becoming buried under the mooring bed surface, for example, by closure over the acoustic transponder of the entry cavity in the mooring bed soil produced during embedment of the anchor; acoustic signal degradation problems over long transmission distances to the floating vessel due to attenuation and due to reflection and refraction by layers of sea water having differences in salinity; and signal swamping by noise emanating from the floating vessel.

International Patent Applications WO 2010/041929 A1 and WO 2010/062184 A2 also disclose means for communicating data along a path between instrumentation mounted on an anchor buried in a mooring bed and data receiving equipment on a floating vessel but, in each application, the means disclosed suffers from at least two of the disadvantages noted in the preceding paragraph.

It is an object of the present invention to provide a system for communicating data between an anchor buried in a mooring bed below a body of water and a structure floating in the body of water which avoids or mitigates at least one of the above-mentioned disadvantages.

In the following: a mooring line, for carrying tensile loading and connecting an anchor to a moored structure, is to be construed as including all components thereof such as, for example, wire ropes and wire rope terminations, synthetic ropes and synthetic rope terminations, chains, and any connecting shackles, swivels, and links that may be present between mooring line portions or attached thereto by way of extension for the purpose of carrying tensile loading; a transceiver is to be construed as a device adapted for transmitting and or receiving data-containing signals electrically, or optically, or electromagnetically when connected to an antenna; a transponder is to be construed as a device adapted for transmitting and or receiving data-containing signals electrically, or optically or, where said signals are transmitted or received via a body of water, acoustically; and "heading" is to be construed in the marine sense as meaning azimuthal direction.

According to a first aspect of the present invention, an anchor data communication system, for communicating data at least one way between instrumentation attached to an anchor for burial in a mooring bed under a body of water and a transceiver carried by a structure floating on said body of water, said anchor being attached to a mooring line comprising a lower portion and an upper portion for connection to a structure floating on said body of water, comprises a first transponder connected by first conductor means to said instrumentation, and a second transponder communicating at least partially via second conductor means with said transceiver, wherein at least one transponder is attached to a line member connected to said anchor such that an axis of an emission beam of said at least one transponder is substantially constrained in heading by said line member to maximize the strength of signals from said first transponder (10) arriving at said second transponder (12, 12A).

Preferably, said line member comprises said mooring line.

Preferably, said axis has the heading of said line member.

Preferably, said at least one transponder is directional in having a directional axis along which substantially maximum signal strength occurs in a directional beam emitted therefrom.

Preferably said directional beam has a conical divergence included angle which does not exceed 90°, and further preferably does not exceed 60°.

Preferably, said at least one transponder is attached to said line member such that said directional axis forms an acute angle with an adjacent portion of said line member.

Preferably said acute angle is in the range 0° to 60°.

Preferably, said line member comprises a drogue tail including a drag member for dragging behind said anchor in contact with a surface of a mooring bed to produce a force for constraining the heading of said anchor in the direction of dragging prior to embedment of said anchor.

Preferably, said drogue tail is of sufficient length to allow said drag member to remain on said surface when said anchor is buried there-below.

Preferably said first transponder is attached to said drogue tail in the vicinity of said drag member whereby said first transponder is maintained at or above said surface.

Preferably said first transponder is attached to said lower portion of said mooring line at a spacing distance from a point of attachment of said mooring line to said anchor, measured along said mooring line, such as to be maintained in a position at or above a surface of said mooring bed.

Preferably said spacing distance is between 1 and 7 times the depth of penetration of said point of attachment below said surface of said mooring bed.

Preferably at least one of said first transponder and said second transponder is attached to said line member by rotatable attachment means whereby said at least one transponder can rotate about said line member.

Preferably said rotatable attachment means is equipped with at least one of buoyancy means and counter-weight ballast means offset from said line member whereby a force is produced to rotate said rotatable attachment means such as to maintain said one transponder above an adjacent point on said line member.

Preferably, the position of said second transponder on said mooring line is separated from said structure sufficiently to obviate acoustic signal swamping at said second transponder of signals from said first transponder by acoustic noise emanating from said structure.

Preferably, said second transponder is movable along said mooring line to reduce separation from said first transponder and to reduce attenuation of signal received therefrom.

Preferably at least one of said first and second conductor means comprises an electrical conductor, an optical conductor, or a fluid conductor.

Preferably said fluid conductor is filled with water and closed at an upper end by an elastically deformable pressure-transmitting element and at a lower end by a pressure transducer whereby total water column pressure at said pressure transducer, when buried in said mooring bed, is measurable uninfluenced by pore pressure in adjacent soil of said mooring bed.

Preferably, said instrumentation on said anchor includes a chargeable element, such as a supercapacitor, which is chargeable by a power source of said first transponder whereby said chargeable element acts to provide an interim local power supply for sustaining said instrumentation during underwater replacement of said power source or said first transponder.

Preferably at least one of said transponder and said transceiver is a device adapted for transmitting and receiving data-containing signals at least one of electrically, electromagnetically, optically, and acoustically.

Preferably, said first transponder includes a pressure transducer to enable monitoring of depth of immersion and height of said first transponder above said surface of said mooring bed.

Preferably, said anchor is provided with a trailable resistance member arranged to produce a drag resistance force when dragged through water.

Preferably, said trailable resistance member comprises an underwater parachute.

Embodiments of the present invention will now be described by way of example with reference to the accompanying drawings wherein.

Referring to FIGS. 1-8, first, second, and third arrangements of an underwater data communication system 1 (FIG. 1), for communicating data between instrumentation 2, mounted on anchor 3 and adjacent to an attachment point A located at pin 3A of shackle 3B on shank 3C of anchor 3, said anchor 3 having the capability of burying in a mooring bed 4 having a surface 5 under a body of water 6 when pulled, via shackle 3B, by a mooring line 7 attached to an anchor handling vessel 8 floating at surface 6A of body of water 6, and transceiver 9 located on vessel 8, comprises first transponder 10 attached to a lower portion 7A of mooring line 7 and connected to instrumentation 2 by first conductors 11 included in armoured cable 11A external to lower portion 7A, and second transponder 12, 12A, or 12D, communicating with transceiver 9 on vessel 8.

Figure 1:
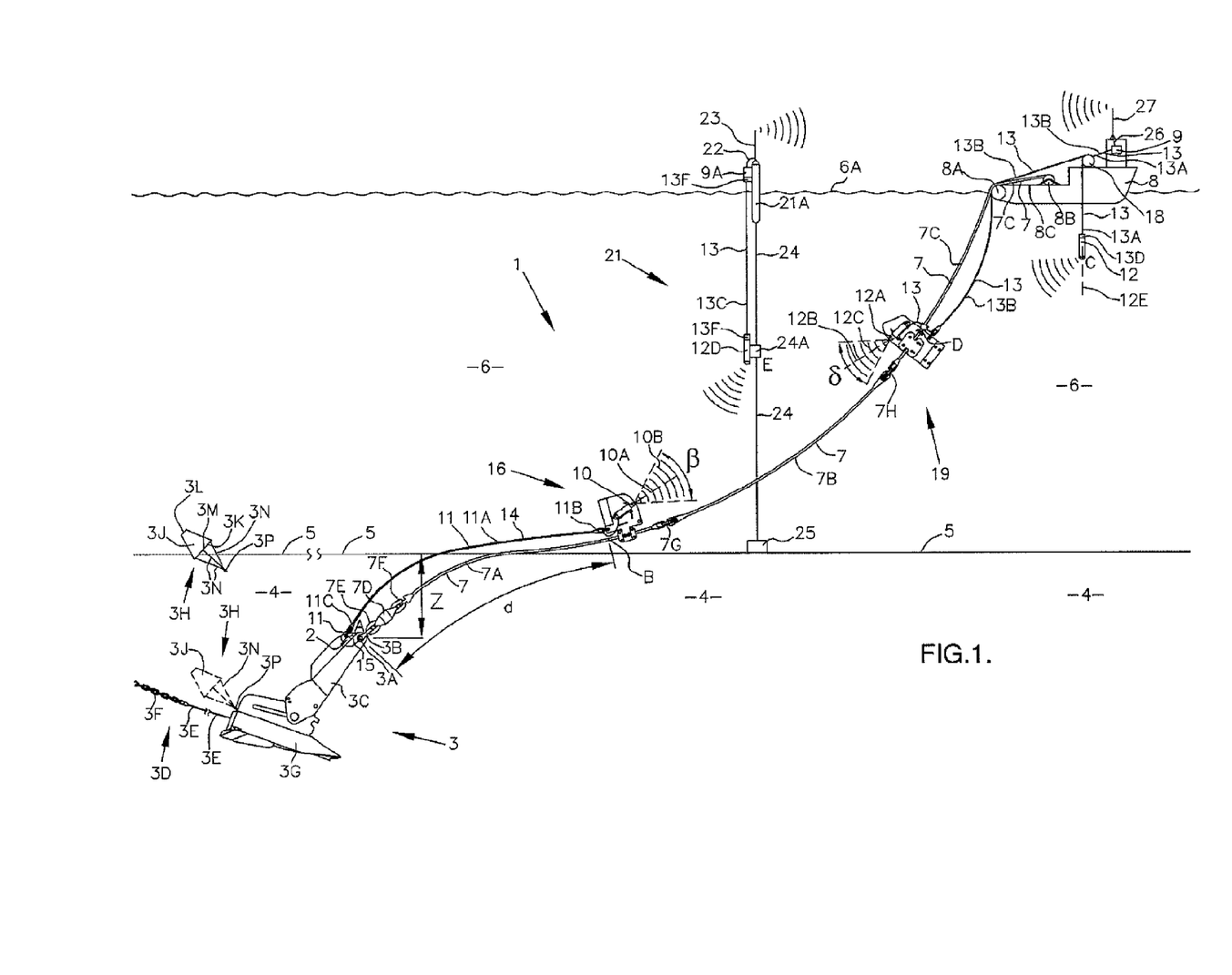
FIG. 1 shows a representation of an anchor data communication system including alternative arrangements for data-containing signal reception.

Second transponder 12, 12A is connected directly to transceiver 9 by second conductors 13 whereas second transponder 12D communicates with transceiver 9 partially via second conductors 13.

To constrain the heading of anchor 3 while lowering anchor 3 down through body of water 6 during forward movement of vessel 8, at a speed of about one knot, an expendable parachute assembly 3H (FIG. 1) including a fabric parachute 3J is shackled to the rear of fluke 3G. Parachute 3J produces drag resistance in water, in the manner of an aircraft braking parachute in air, and has the shape of a truncated cone with an inlet 3K and an outlet 3L and an overall length of $0.5\sqrt{A}$, where A is the plan area of anchor fluke 3G. The diameters of inlet 3K and outlet 3L are equal to $0.5\sqrt{A}$ and $0.15\sqrt{A}$ respectively. Thus, when fluke 3G has a plan area of about 12 m$^2$, parachute 3J would be 1.7 m long and inlet 3K and outlet 3L would have diameters of 1.7 m and 0.5 m respectively. Inlet 3K is held open and stiffened by a hoop 3M. Three wires 3N, each of length $0.8\sqrt{A}$ and diameter 4 mm, are attached to hoop 3M and spaced 120° apart thereon. Wires 3N are brought together to form a bridle attached to a breakable weak link 3P which is shackled to the rear of fluke 3G of anchor 3.

When anchor 3 buries in mooring bed 4, soil resistance to burial of parachute 3J parts weak link 3L and leaves expendable parachute assembly 3H behind at surface 5. Parachute assembly 3H is shown in FIG. 1, using unbroken lines, at surface 5 after parting of weak link 3L. Parachute assembly 3H is also shown in FIG. 1, using broken lines, to indicate the position it would have occupied relative to anchor 3 when attached to the rear of fluke 3G while moving in body of water 6 and prior to parting of weak link 3L.

A drogue tail 3D is shackled to the rear of fluke 3G of anchor 3 to constrain the directional heading of anchor 3 to be that of vessel 8 while approaching surface 5 of mooring bed 4 when chain 3F is dragging on surface 5. Thus, drogue tail 3D, anchor 3, mooring line 7, and vessel 8 have the same directional heading during installation of anchor 3 in mooring bed 4. When fluke 3G has a plan area of about 12 m$^2$, drogue tail 3D would typically be chosen to include some 50 m to 100 m of 30 mm wire rope 3E and 12 links of 76 mm chain 3F.

In a modification (FIG. 8) of anchor data communication system 1, described later, first transponder 10 is attached to wire rope 3E adjacent chain 3F via mounting 16.

Transceiver 9, 9A is energised by a power supply (not shown) which also powers transponder 12, 12A, or 12D, via conductors 13 in corresponding armoured cables 13A, 13B, or 13C. Transceiver 9, 9A is capable of transmitting and or receiving data-containing signals at least one of electrically, optically, and electromagnetically when connected to an antenna. Transponders 10,12, 12A, and 12D, are capable of transmitting or receiving data-containing signals at least one of electrically, optically, acoustically (where said signals are sonar signals propagating in said body of water), and electromagnetically (when connected to a suitable underwater antenna). Transponder 10 includes a pressure transducer (not shown) which enables transponder 10 to transmit pressure data to transceiver 9 enabling both the depth of transponder 10 below surface 6A of body of water 6 and the height of transponder 10 above surface 5 of mooring bed 4 to be determined.

Mooring line 7 comprises lower portion 7A, an intermediate portion 7B, and an upper portion 7C (FIG. 1). A low friction swivel 7D connects pin 3A of shackle 3B at attachment point A on anchor 3 to lower portion 7A by means of connecting links 7E and 7F while shackle 7G serves to connect lower portion 7A to intermediate portion 7B and shackle 7H serves to connect intermediate portion 7B to upper portion 7C. Hereinafter, portions 7A, 7B, and 7C of mooring line 7 will be referred to respectively as forerunner 7A (comprising torque-balanced wire rope, as shown in FIGS. 1, 2, 4, and 5, or chain), synthetic rope 7B, and work-wire 7C, using terminology typical of the offshore industry. A long length of work-wire 7C is stored on winch drum 8B on deck 8C of anchor handling vessel 8. The use of torque-balanced wire rope, or chain, in forerunner 7A, in conjunction with low friction swivel 7D, minimises or avoids rotation of anchor 3 occurring undesirably due to turns induced by tension in forerunner 7A during lowering anchor 3 from vessel 8 to mooring bed surface 5.

In the first arrangement of anchor data communication system 1, second transponder 12 is omni-directional and is suspended by armoured cable 13A, with emission beam axis 12E vertical, at position C below and separated from vessel 8 (FIG. 1).

In the second arrangement of anchor data communication system 1, second transponder 12A is directional, having an emission beam axis 12B, and is attached to work-wire 7C at a position D thereon to utilise the heading of work-wire 7C to direct emission beam axis 12B towards first transponder 10.

Position C of transponder 12 in the first arrangement of system 1 and position D of carriage 19 on work-wire 7C in the second arrangement of system 1 are chosen with a distance of separation from vessel 8 sufficient to ensure that acoustic noise emanating there-from is attenuated and so does not swamp acoustic signals arriving from first transponder 10 at second transponder 12, 12A.

First and second conductors 11 and 13 comprise conductors of any or all of the following: electrical signals; optical signals; or electrical power. First and second conductors 11 and 13 are incorporated respectively in armoured cables 11A and 13A or 13B (or, in the third arrangement, 13C) which are strengthened to provide protection from crushing and to carry significant tensile loading such as that induced in armoured cable 11A when dragged in mooring bed 4.

In addition to conductors 11, armoured cable 11A includes a water filled tubular conductor 14 (FIG. 3), terminated at an upper end 14A (FIG. 4) by an elastically deformable pressure transmitting bulb 14B, serving to conduct pressure in order to provide effectively an extension of the water column above mooring bed surface 5 to pressure transducer 15 (FIG. 2) connected to instrumentation 2 and located adjacent to attachment point A on buried anchor 3 whereby total water column water pressure at attachment point A is measured uninfluenced by pore pressure in adjacent soil of mooring bed 4. This allows the depth of attachment point A below surface 5 to be determined by subtracting the pressure previously measured by pressure transducer 15, when attachment point A was at surface 5, from the pressure measured at the buried position of attachment point A. Also, when anchor 3 is above surface 5, pressure transducer 15 serves to provide pressure measurements from which the height of attachment point A above surface 5 may be determined.

Instrumentation 2 includes a microprocessor and measures roll and pitch of anchor 3, load and direction of load in pin 3A of shackle 3B, and height or depth of attachment point A (i.e. height or depth of pin 3A) respectively above or below surface 5 of mooring bed 4 by computation from pressure measurements made by pressure transducer 15. Instrumentation 2 also measures distance moved along a burial trajectory of anchor 3 in mooring bed 4 and measures the inclination of the trajectory at points thereon as described in European Patent EP 0 820 400 B3. The measurement data is digitally encoded and transmitted electrically to transponder 10 for acoustic transmission to transponder 12 or 12A (or transponder 12D in the third arrangement) followed by electrical transmission to transceiver 9 (or to transceiver 9A followed by electromagnetic transmission to transceiver 9 in the third arrangement). The data received by transceiver 9 is stored in a computer and displayed in real time on a monitor screen for viewing by mooring personnel on vessel 8.

Figures 2, 3, 4:
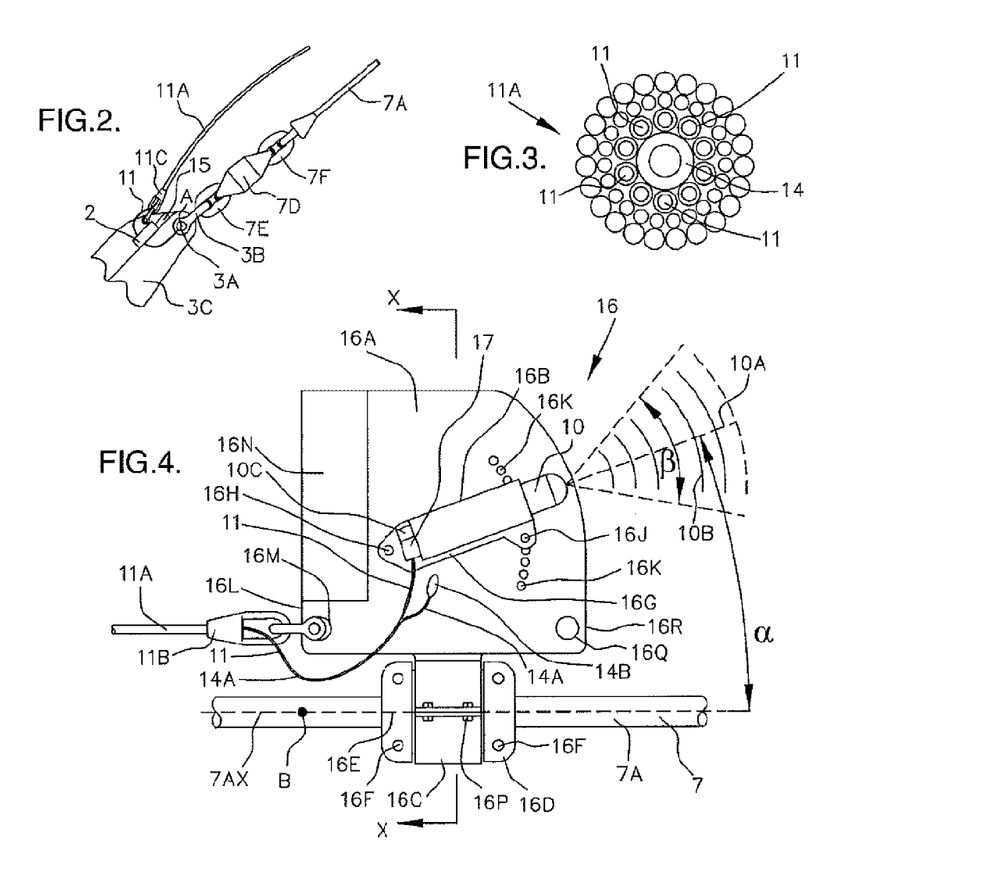
FIG. 2 shows a detail of part of the anchor data communication system of FIG. 1.
FIG. 3 shows a cross-section of an armoured conductor cable shown in FIG. 1.
FIG. 4 shows a partially sectioned first transponder mounting shown in FIG. 1.
Figure 5:
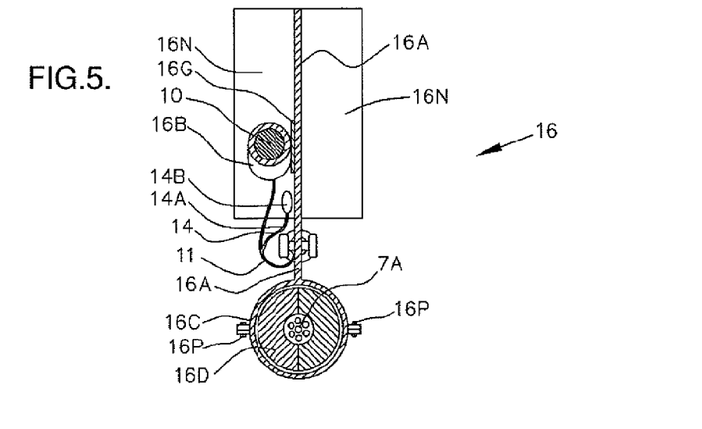
FIG. 5 shows a cross-section at X-X of the mounting shown in FIG. 4.
Figure 6:
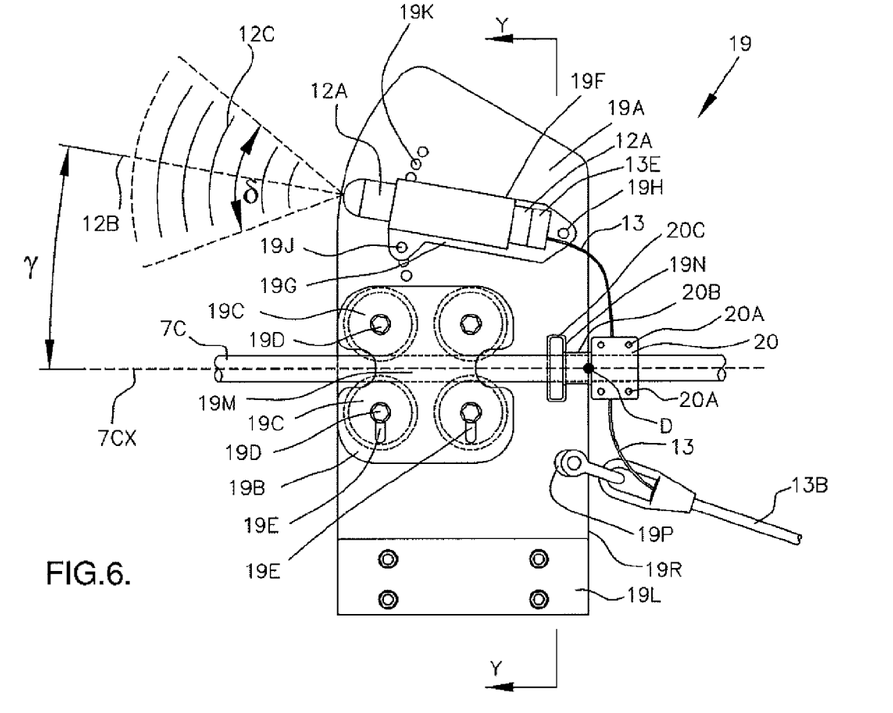
FIG. 6 shows a partially sectioned second transponder mounting shown in FIG. 1.
Figure 7:
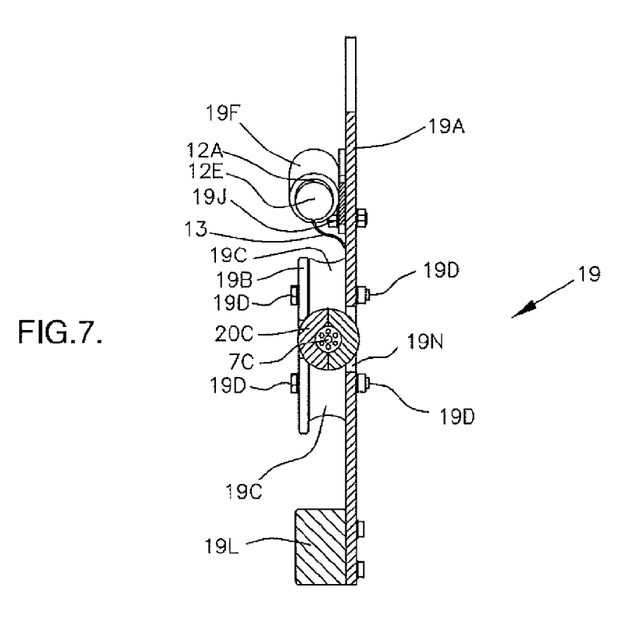
FIG. 7 shows a cross-section at Y-Y of the mounting shown in FIG. 6.
Figure 8:
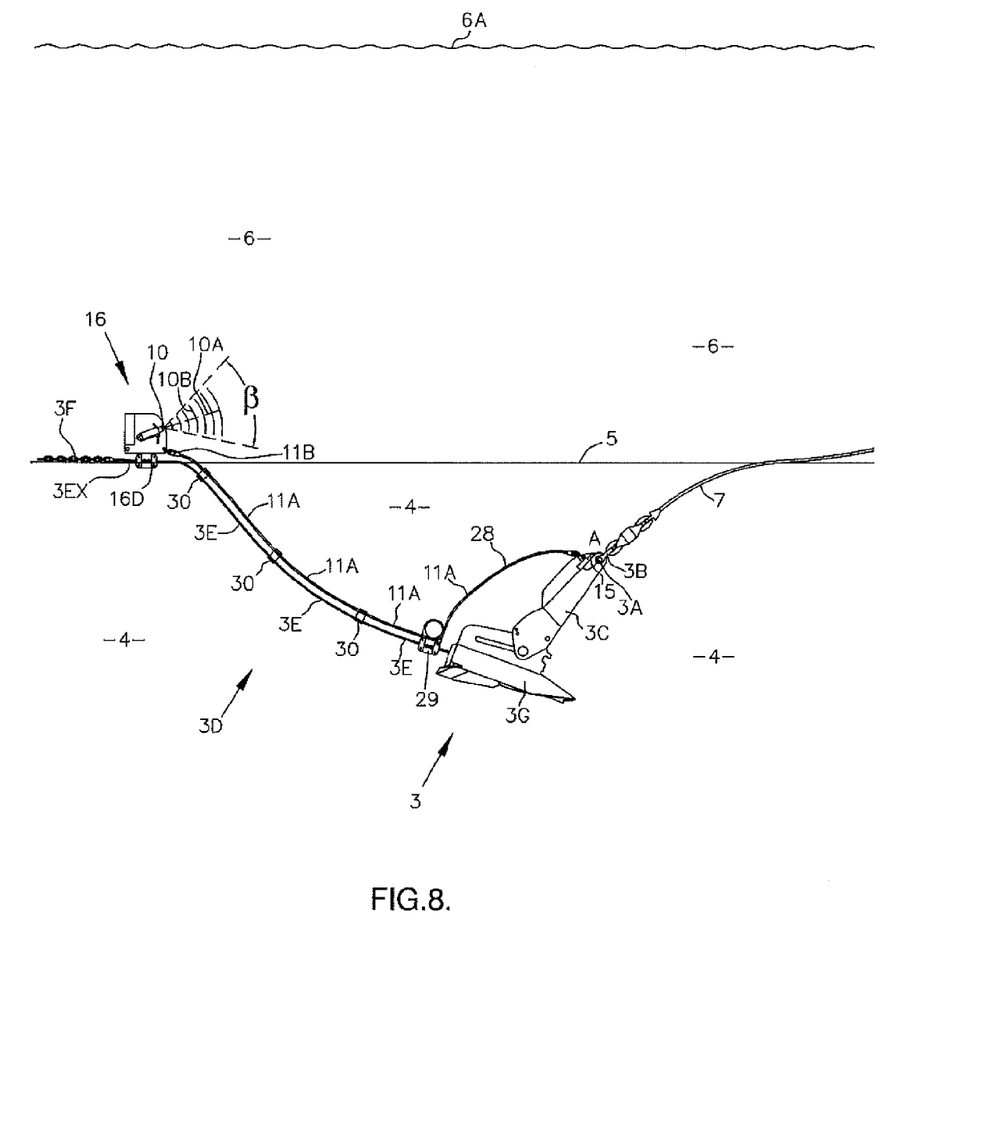
FIG. 8 shows a modification of the anchor data communication system shown in FIG. 1.

First transponder 10 is arranged to face second transponder 12, or 12A, and is located on mounting 16 (FIGS. 4 and 5) comprising planar fin 16A, cylindrical tube 16B housing first transponder 10, splittable cylindrical sleeve 16C and splittable cylindrical clamp 16D. Clamp 16D is configured internally to be suitable for clamping onto a wire rope, such as wire rope forerunner 7A (FIG. 4), or onto a link of a chain forerunner 7A (not shown). Sleeve 16C is rotatably mounted on clamp 16D. Planar fin 16A is attached to sleeve 16C in alignment with axis 16E common to sleeve 16C and clamp 16D. Clamp 16D is fixed by means of bolts 16F to forerunner 7A (or to wire rope 3E as shown in FIG. 8). When clamp 16D is fixed to forerunner 7A, axis 16E coincides with axis 7AX (FIG. 4). Cylindrical tube 16B is attached to plate 16G which is fastened to planar fin 16A by bolt 16H and bolt 16J. A series of alternative holes 16K, disposed in an arc centred on bolt 16H, are provided in planar fin 16A to receive bolt 16J so that cylindrical tube 16B, transponder 10 therein, and axis 10A thereof can be inclined to axis 7AX of forerunner 7A (or axis 3EX of wire rope 3E as shown in FIG. 8) by a forward-opening acute angle α (FIG. 4) selectable in steps of 5° in the range 0° to 60° by locating bolt 16J in an appropriate hole 16K. Acute angle α thus opens in the direction of second transponders 12 and 12A (FIG. 1) due to heading constraint provided by forerunner 7A (or wire rope 3E, FIG. 8). Mounting 16 permits first transponder 10 to be rotated in an orbit around forerunner 7A (or wire rope 3E) while inclined at a selected acute angle α.

When mounting 16 is attached to forerunner 7A, an aft edge 16L of planar fin 16A faces anchor 3 and is aligned with a position B on forerunner 7A (FIG. 1). Position B is separated from attachment point A by a minimum spacing distance d, measured along forerunner 7A, such that first transponder 10 is located above or at surface 5 of mooring bed 4 during drag embedment of anchor 3 in order to avoid acoustic signal transmission and reception being muffled by soil due to burial of first transponder 10 in mooring bed 4. Minimum spacing distance d is chosen to be at least equal to the maximum calculated embedded length of forerunner 7A which becomes embedded in the soil of mooring bed 4 during installation of anchor 3. Typically, minimum spacing distance d will be in the range of 1 to 7 times the desired penetration depth Z (FIG. 1) of pin 3A of shackle 3B of anchor 3 below surface 5 of mooring bed 4.

Termination 11B of armoured cable 11A is mechanically attached via hole 16M in fin 16A at edge 16L so that tensile loading in armoured cable 11A induced by being dragged in mooring bed 4 is transferred to forerunner 7A via fin 16A, sleeve 16C, and clamp 16D. Termination 11C of armoured cable 11A is mechanically attached to shank 3C of anchor 3 adjacent to instrumentation 2 so that armoured cable 11A can trail behind forerunner 7A during burial of anchor 3 into mooring bed 4 and carry tensile loading which otherwise would be imposed on conductors 11 and 14. Rotation of sleeve 16C prevents armoured cable 11A from being wrapped around forerunner 7A if any turns are induced in forerunner 7A by tensile loading therein and so avoids the possibility of subsequent damage occurring to armoured cable 11A by kinking about forerunner 7A during installation of anchor 3 or by crushing between forerunner 7A (loaded by the weight of anchor 3) and stern roller 8A of anchor handling vessel 8 during recovery of anchor line 7 and anchor 3 over stern roller 8A. The length of armoured cable 11A is arranged to exceed minimum distance d sufficiently to ensure that elongation of forerunner 7A due to tensile loading therein does not induce tensile loading in armoured cable 11A and to ensure that armoured cable 11A can be hauled well to one side of forerunner 7A to avoid crushing due to a slack bight of armoured cable 11A wedging there-under during traversal of stern roller 8A. Typically, the length of armoured cable 11A will be some 6 to 9 meters greater than distance d.

During embedment of anchor 3, rotation of cylindrical sleeve 16C, together with the presence of slack in armoured cable 11A, enables armoured cable 11A to be deflected automatically into a minimum energy position by following in the wake of forerunner 7A, that is, in soil disturbed by forerunner 7A cutting through mooring bed 4 during installation of anchor 3 since the disturbed undrained shear strength of typical clay soil in mooring bed 4 is generally less than half that of the undisturbed undrained shear strength. This confers considerable benefit by greatly reducing the magnitude of tensile loading induced in armoured cable 11A while trailing behind forerunner 7A in mooring bed 4.

Planar fin 16A of mounting 16 is fitted with buoyancy elements 16N (FIGS. 4 and 5) which provides positive buoyancy sufficient to rotate sleeve 16C about clamp 16D such that first transponder 10 is maintained in a position above adjacent forerunner 7A when submerged. This also serves to keep first transponder 10 free from being muffled by soil when forerunner 7A is initially laid out on surface 5 of mooring bed 4 prior to tensioning mooring line 7 to embed anchor 3. The moment of buoyancy forces about axis 16E and axis 7AX enables fin 16A to resist being rotated about forerunner 7A by transverse friction forces arising from clamp 16D being rotated by turns developing in forerunner 7A due to tensile forces increasing therein.

First transponder 10 emits a directional acoustic beam 10B having substantially maximum signal strength propagating along axis 10A (FIGS. 1 and 4) of transponder 10. Acoustic beam 10B is axially symmetrical about axis 10A and substantially contained within a conical included angle $\beta$ which does not exceed 90° and preferably does not exceed 60°. As mentioned previously, first transponder 10 is attached to mounting 16 such that axis 10A is maintained at a pre-selected acute angle $\alpha$ to forerunner 7A (or wire rope 3E) with a heading constrained by forerunner 7A or wire rope 3E towards transponder 12 or 12A.

When first transponder 10 is attached to forerunner 7A, a mooring line catenary calculation program is used to determine approximately the inclination of forerunner 7A at mounting 16 during installation of anchor 3 to permit an optimum value of angle $\alpha$ to be selected to aim axis 10A of acoustic beam 10B of first transponder 10 towards second transponder 12 or 12A to maximise the strength of signal arriving at second transponder 12 or 12A. A similar catenary calculation is performed to optimise angle $\alpha$ when first transponder 10 is attached to wire rope 3E (FIG. 8). This enables minimising the size or maximising the life of power source 10C (FIG. 4) of first transponder 10.

First transponder 10 is arranged to be easily removable from tube 16B to permit first transponder 10 to be replaced underwater by means of a suitably equipped remotely controlled vehicle (not shown). Further, the power source 10C of first transponder 10, which also supplies power to instrumentation 2 via first conductors 11, is arranged to be easily removable to permit power source 10C to be replaced underwater by means of a remotely controlled vehicle. Accordingly, at least one of instrumentation 2, first transponder 10, and power source 10C is equipped with a short-circuit management facility enabling the use of an electrical connector 17 (FIG. 4), designed to be connected and disconnected underwater, to facilitate replacement underwater of first transponder 10 and or power source 10C. In this context, either or both of instrumentation 2 and first transponder 10 includes a power storage device (not shown), such as a battery or a super-capacitor, which is chargeable by power source 10C via first conductors 11 in armoured cable 11A and serves to act as a temporary local power supply for instrumentation 2 or first transponder 10 during the period when first transponder 10 and or power source 10C is disconnected while being replaced. Alternatively, power source 10C is provided with an externally accessible inductive coupling coil to permit rechargeable batteries (not shown) in power source 10C to be recharged inductively underwater by a suitably equipped remotely controlled vehicle. The anchor data communication system is thus capable of being operated over indefinite periods of time.

In the first arrangement of the anchor data communication system (FIG. 1), second transponder 12 is connected to transceiver 9 by second conductors 13 in armoured cable 13A stored on a slip-ring equipped winch drum 18 on vessel 8. Armoured cable 13A and second conductors 13 therein are connected to second transponder 12 by wet-mateable mechanical and electrical connector 13D. Slip-ring equipped winch drum 18 is rotatable while paying out or heaving in armoured cable 13A without interrupting the transmission of signals and power in second conductors 13 between second transponder 12 and transceiver 9.

In the second arrangement (FIG. 1), second transponder 12A is connected to transceiver 9 by second conductors 13 in armoured cable 13B stored on storage drum 18 in a similar manner as for the first arrangement.

Second transponder 12A is mounted, facing first transponder 10, on carriage 19 (FIGS. 1, 6, and 7) which is movable on work-wire 7C and comprises planar elongated rectangular plate 19A and planar rectangular plate 19B with four saddle-shaped rollers 19C positioned there-between on spacer spindle bolts 19D spacing and connecting plates 19A and 19B. Saddle-shaped rollers 19C are arranged in two pairs with one pair at each side of work-wire 7C. Plates 19A and 19B each have two parallel slots 19E arranged transverse to work-wire 7C to receive two spacer spindle bolts 19D to allow the separation between pairs of saddle-shaped rollers 19C to be varied to accommodate different diameters of work-wire 7C. A cylindrical tube 19F for housing second transponder 12A is attached to plate 19G which is fastened to plate 19A by bolt 19H and bolt 19J at one side of work-wire 7C. A series of alternative holes 19K, disposed in an arc centred on bolt 19H, are provided in plate 19A to receive bolt 19J so that cylindrical tube 19F, transponder 12A therein, and axis 12B thereof can be inclined to axis 7CX of work-wire 7C by an acute angle γ (FIG. 6) selectable in steps of 5° the range 0° to 60° by locating bolt 19J in an appropriate hole 19K. Angle γ opens in the direction of transponder 10. Mounting 19 permits second transponder 12A to rotate orbitally around work-wire 7C while inclined at a selected acute angle γ.

A counter-weight 19L (FIG. 6), by way of ballast, is attached to plate 19A distal from cylindrical tube 19F at an opposite side of work-wire 7C and is of mass sufficient to cause carriage 19 to pivot about a pair of saddle-shaped rollers 19C distal from counter-weight 19L to maintain tube 19F and second transponder 12A therein in a position above adjacent work-wire 7C. Plate 19B has a waist 19M to reduce bending moment applied to plate 19B by work-wire 7C while carriage 19 is traversing stern roller 8A of anchor handling vessel 8 with plate 19B making contact with stern roller 8A. The moment of counter-weight 19L about axis 7CX enables carriage 19 to resist being rotated about work-wire 7C by transverse friction forces induced between work-wire 7C and rollers 19C by turns being generated in work-wire 7C by increasing tensile forces therein.

A cylindrical split clamp 20 (FIG. 6), with clamping bolts 20A, is provided for clamping onto work-wire 7C. Clamp 20 has a cylindrical extension 20B bearing a circular flange 20C which is fittable in a slot 19N in plate 19A of carriage 19 whereby carriage 19 can be locked axially to but remain rotatable about work-wire 7C.

Armoured cable 13B is attached via a hole 19P at an edge 19R of plate 19A below and adjacent to work-wire 7C and facing vessel 8. The weight of armoured cable 13B hanging in a bight (FIG. 1) assists counter-weight 19L to maintain tube 19F and second transponder 12A above work-wire 7C and assists in resisting the before-mentioned transverse friction forces tending to rotate carriage 19. Position D referred to previously is a point on work-wire 7C (FIG. 6) adjacent edge 19R of plate 19A separated from vessel 8 sufficiently to give acceptable attenuation of acoustic noise emanating from vessel 8.

When carriage 19 is locked axially to work-wire 7C by cylindrical split clamp 20, second transponder 12A is carried to position D or beyond position D in the course of paying out work-wire 7C prior to embedding anchor 3 in mooring bed 4. When carriage 19 is not locked axially to work-wire 7C by cylindrical split clamp 20, second transponder 12A is located adjacent position D or beyond position D by rolling under gravity down work-wire 7C when paying out armoured cable 13B from storage drum 18 after completion of paying out work-wire 7C.

Second transponder 12A emits a directional acoustic beam 12C having substantially maximum signal strength propagating along axis 12B (FIGS. 1 and 6) of acoustic transponder 12A. Acoustic beam 12C is axially symmetrical about axis 12B and substantially contained within a conical included angle δ which does not exceed 90° and preferably does not exceed 60°. As mentioned previously, second transponder 12A is mounted on carriage 19 such that axis 12B is maintained at a pre-selected angle γ to axis 7CX of work-wire 7C adjacent to second transponder 12A with a heading along work-wire 7C towards anchor 3 and first transponder 10. A mooring line catenary calculation program is used to determine approximately the inclination of work-wire 7C adjacent mounting 19 during installation of anchor 3 to permit an optimum value of angle γ to be selected to aim axis 12B of acoustic beam 12C of second transponder 12A towards first transponder 10 to maximise the strength of signal arriving at first transponder 10.

By paying out more of armoured cable 13B, carriage 19 can be lowered further along work-wire 7C to reduce the distance separating second transponder 12A from first transponder 10 to be considerably less than that occurring at position D. This can increase significantly the signal strength arriving at second transponder 12A from first transponder 10 and vice versa, when using very long lengths of work-wire 7C in ultra deep water, and so prevent the acoustic signal transmitted between transponders from becoming undetectable due to attenuation or signal loss due to reflection and refraction by layers of water of differing salinity.

In the third arrangement of the anchor data communication system (FIG. 1), an acoustic/wireless link 21 is interposed between transponder 10 and anchor handling vessel 8 wherein spar buoy 21A is provided which floats at surface 6A of body of water 6 and is arranged to carry transceiver 9A connected by conductors 22 to antenna 23 for wireless communication of signals. Spar buoy 21A is connected by tether line 24 to a clump weight 25 for placing on surface 5 of mooring bed 4 to moor spar buoy 21A near anchor 3 between first transponder 10 and vessel 8. Second transponder 12D is omni-directional and is attached by clamp 24A to tether line 24 below spar buoy 21A and connected to transceiver 9A by conductors 13 in armoured cable 13C. Conductors 13 in armoured cable 13C are terminated at each end by wet-mateable mechanical and electrical connectors 13F for connection to transponder 12D and transceiver 9A. Transceiver 9A includes a solar cell rechargeable battery power supply (not shown) which powers transceiver 9A and transponder 12D via conductors 13. On vessel 8, transceiver 9 is connected by conductors 26 to antenna 27 for wireless communication of signals. Data is thus communicable along electrical, acoustic, and electromagnetic paths between instrumentation 2 attached to anchor 3 and transceiver 9 on vessel 8. It will be evident that at least one of the data communication paths may be an optical path. Although this arrangement is vulnerable to the spar buoy system being swept away in extreme storm conditions, it provides an alternative method of avoiding acoustic transmission problems that may occur over very long acoustic propagation path lengths.

In a modification (FIG. 8) of the anchor data communication system 1, mounting 16 is clamped to wire rope 3E of drogue tail 3D adjacent to drag chain 3F instead of being clamped to lower portion 7A of mooring line 7 as shown in FIGS. 1 and 4. Armoured cable 11A is directed aft from shank 3C of anchor 3 in a bight 28 to follow wire rope 3E by being attached thereto by bend-restricting clamp 29 and clamps 30. Termination 11B of armoured cable 11A is attached to hole 160 (FIG. 4) at forward edge 16R of fin 16A in mounting 16 and conductors 11 and 14A are connected as previously described. Wire rope 3E and armoured cable 11A are selected to have sufficient length, typically 60 m to 100 m, to allow mounting 16 to remain at surface 5 of mooring bed 4 when anchor 3 is at maximum depth of penetration below surface 5. The heading of transponder 10 is thus constrained by wire rope 3E of drogue tail 3D to be the same as that of anchor 3, mooring line 7, and installation vessel 8 during embedment of anchor 3.

In use, in each of the three arrangements, anchor data communication system 1 is assembled on deck 8C of anchor handling vessel 8 while heading slowly, at about one knot, towards the desired touch-down point of anchor 3 on mooring bed surface 5.

Anchor 3 is laid out near stern roller 8A and drogue tail 3D is shackled to the rear of fluke 3G together with expendable parachute assembly 3H. Instrumentation 2 together with pressure transducer 15 is mounted adjacent to attachment point A on shank 3C of anchor 3. Termination 11C of armoured cable 11A is shackled to shank 3C. Conductors 11 and 14 in armoured cable 11A are connected to instrumentation 2 and pressure transducer 15 respectively. Shackle 3B is connected by pin 3A to attachment point A on shank 3C. Low friction swivel 7D is connected to shackle 3B with a connecting link 7E.

Torque balanced wire rope forerunner 7A is stored over work-wire 7C on winch drum 8A on deck 8C of vessel 8, being connected thereon to work-wire 7C, while armoured cable 11A (FIG. 3) is stored on a storage reel (not shown) on deck 8C. Synthetic rope 7B is stored on an auxiliary winch drum (not shown) on deck 8C.

Forerunner 7A is paid out from winch drum 8B and hauled out along deck 8C to swivel 7D, stopped, and connected thereto by connecting link 7F (FIGS. 1 and 2). Forerunner 7A and armoured cable 11A are paid out in step allowing drogue tail assembly 3D and parachute assembly 3H followed by anchor 3 to be pushed over and then held at stern roller 8A, using tugger winches (not shown).

The propellers of vessel 8 are now stopped temporarily to allow anchor 3 to be lowered into body of water 6 in a stable manner through the zone in which turbulent helical motion of water, normally present due to propeller action, may otherwise have caused anchor 3 to spin undesirably about forerunner 7A. The momentum of vessel 8, with propellers temporarily stopped, is sufficient to maintain smooth water flow over anchor 3 and into parachute 3J to hold anchor 3 in a desired heading towards vessel 8. Once anchor 3 is through the propeller turbulence zone, propellers are started again and lowering of anchor 3 continued. Forerunner 7A is led centrally over stern roller 8A while armoured cable 11A is led over the side of stern roller 8A which is nearest to transponder 10 and clear of forerunner 7A to avoid trapping a bight of armoured cable 11A under forerunner 7A.

When pre-marked point B on forerunner 7A, located on and close to the upper end of forerunner 7A, arrives at a suitable position on deck near stern roller 8A, paying out of forerunner 7A and an attached portion of work-wire 7C, is stopped to allow mounting 16 to be attached to forerunner 7A by clamp 16D in alignment with point B. Transponder 10 is then installed in tube 16B of mounting 16 (FIG. 4). Termination 11B of armoured cable 11A is taken off the storage reel and is shackled to fin 16A of mounting 16 via hole 16M and conductors 11 issuing from termination 11B are connected via wet-mateable electrical connector 17 to power supply 10C of transponder 10. Water pressure tube 14 and terminating pressure bulb 14B are pre-filled with sea water. Pressure bulb 14B is then stowed in a protective housing (not shown) attached to plate 16G of mounting 16. Acute angle $\alpha$ between axis 10A of transponder 10 and adjacent axis 7AX of forerunner 7A is now selected and set by locating bolt 16J in an appropriate hole 16K in fin 16A of mounting 16.

A portion of synthetic rope 7B is paid out off the auxiliary winch drum to reach the upper end of forerunner 7A, stopped, and then connected by shackle 7G to forerunner 7A (FIG. 1) in place of work-wire 7C in a disconnect-and-change-over procedure using shark's jaws (not shown) on deck 8C near stern roller 8A. The disconnected end termination of work-wire 7C is left out on deck 8C ready for the next disconnect-and-change-over operation. Power source 10C is now switched on to energise both instrumentation 2 and transponder 10 in sleep mode until activated into an awake mode by an acoustically received command signal from transponder 12, 12A, or 12D prior to arrival of anchor 3 at surface 5 of sea bed 4.

Paying out of synthetic rope 7B is recommenced and mounting 16 passes over stern roller 8A with fin 16A held to one side of forerunner 7A by guiding armoured cable 11A. The forward motion of vessel 8, at about one knot, generates drag forces which deflect forerunner 7A away from vertical and causes anchor 3, acted on by parachute 3J assisted by swivel 7D, to turn in the water to adopt the heading of vessel 8 during lowering through body of water 6. Buoyancy elements 16N on mounting 16 rotates fin 16A and termination 11B of armoured cable 11A to a position above and behind forerunner 7A. This allows armoured cable 11A to stream out behind forerunner 7A between fin 16A and anchor shank 3C and be maintained in position by water movement without wrapping around forerunner 11A.

When the upper end of synthetic rope 7B (FIG. 1), which is attached by a handling tail to the auxiliary winch drum, arrives near stern roller 8A adjacent to the disconnected end termination of work-wire 7C lying on deck 8C, paying out is stopped. Work-wire 7C is connected by a shackle 7H to synthetic rope 7B in place of the handling tail in a disconnect-and-change-over procedure as before. The handling tail is then heaved back onto the auxiliary winch drum for storage.

In the second (preferred) arrangement, carriage 19 (FIG. 4) is now fitted to work-wire 7C which is lying on deck 8C of anchor handling vessel 8 having been connected to synthetic rope 7B by shackle 7H as previously mentioned. Plate 19B of carriage 19 is arranged to be located between work-wire 7C and deck 8C. All four rollers 19C of carriage 19 are brought into contact with work-wire 7C by adjusting the position of spacer spindle bolts 19D in slots 19E of plate 19B while ensuring that carriage 19 remains free to rotate about work-wire 7C. Transponder 12A is fitted in housing tube 19F. Acute angle $\gamma$ is selected and set by locating bolt 19J in plate 19G and in an appropriate hole 19K in plate 19A. Armoured cable 13B is paid out from slip-ring equipped winch drum 18 and shackled to plate 19A of mounting 19 at hole 19P. Conductors 13 are then connected electrically to transponder 12A by wet-mateable electrical connector 13E. Transponder 12A and transceiver 9, now connected thereto, are energised.

Work-wire 7C and armoured cable 13B are then paid out in step as work-wire 7C passes over the centre of stern roller 8A. Carriage 19 is carried overboard on work-wire 7C. Consequently, plate 19B also passes over the centre of stern roller 8A while waist 19M prevents plate 19B from being bent by being pressed against stern roller 8A by work-wire 7C. Armoured cable 13B is led over the side of stern roller 8A which is furthest from transponder 12A to avoid trapping a bight of armoured cable 13B under work-wire 7C. The position of carriage 19 on work-wire 7C is determined by the length of armoured cable 13B paid out. Paying out of armoured cable 13B is stopped when a desired separation of carriage 19 and transponder 12A from stern roller 8A along work-wire 7C has been established. A command signal is now passed acoustically from transponder 12A to transponder 10 to cause transponder 10 and instrumentation 2 on anchor 3 to switch from sleep mode to active mode and commence sending data through the communication system to transceiver 9. The height of transponder 10 and attachment point A on anchor 3 above surface 5 of mooring bed 4, and other data such as roll and pitch of anchor 3 and inclination of and load in anchor shackle 3B, are now recorded in real time and displayed on a monitor screen to mooring personnel on anchor handling vessel 8 to facilitate control during the installation procedure.

Paying out of work-wire 7C is continued while passing through rollers 19C of carriage 19 until anchor 3 is some 40 meters above surface 5 of mooring bed 4 and 12 links of drogue tail chain 3F are lying on and dragging on surface 5 of mooring bed 4, due to the movement of vessel 8 towards the set-down point of anchor 3. Paying out of work-wire 7C from winch 8B is now stopped. Drag force from drogue tail chain 3F on surface 5 adds to the drag force produced by parachute 3J to maintain the heading of anchor 3 as that of vessel 8 in the direction of the prescribed touch-down point. When anchor 3 is about 150 m (measured horizontally) from the touch-down point for anchor 3, the speed of vessel 8 is reduced to about 0.5 knots. Although the drag force from parachute 3J is reduced by a factor of four, the drag force from chain 3F preserves the heading of anchor 3 as anchor 3 acts in the manner of a pendulum weight in a hanging bight formed by mooring line 7 and drogue tail wire 3E.

When anchor 3 is about 50 m from the touch-down point, the paying-out rate of work-wire from winch 8B is recommenced at 16 m per minute to equal vessel speed. Anchor 3 is consequently lowered into contact with surface 5 of mooring bed 4 while the heading and attitude of anchor 3 is maintained mainly by drag force provided by chain 3F. The touch-down sequence of anchor 3 arriving at surface 5 of mooring bed 4 is observable from data such as height of attachment point A above surface 5, load in and inclination of shackle 3B, and roll and pitch of anchor 3 presented on the monitor screen. These data provide confirmation that the touch-down operation has been executed correctly to plan.

Following touch-down, the speed of vessel 8 and the paying-out rate of work-wire 7C are maintained equal but are increased to one knot and 31 m per minute (being the maximum paying-out rate of winch 8B) respectively until both are stopped when the scope (total length) of mooring line 7 outboard of stern roller 8A is the scope required for embedment of anchor 3. Anchor 3 is now resting on surface 5 of mooring bed 4 at the touch-down point with forerunner 7A and armoured cable 11A laid out horizontally thereon in the heading of vessel 8 without armoured cable 11A having been wrapped round forerunner 7A. Buoyancy elements 16N on mounting 16 act to hold plate 16A upright to ensure that transponder 10 is held away from surface 5 to avoid fouling by mooring bed soil. The scope of mooring line 7 required for embedment of anchor 3 is obtained from an anchor embedment calculation program. This program is used to confirm that the length of forerunner 7A that will become embedded during installation burial of anchor 3 will be less than distance d when maximum tension in mooring line 7 is reached so that mounting 16 and transponder 10 will not be pulled under surface 5 of mooring bed 4.

Propeller thrust is now applied by vessel 8 to tension mooring line 7 and embed anchor 3 in mooring bed 4. If necessary, during tensioning, carriage 19 is moved down along work-wire 7C beyond point D on work-wire 7C by paying out more of armoured cable 13B to reduce separation from transponder 10 and so increase signal strength arriving at transponder 12A from transponder 10. Anchor 3 penetrates below surface 5 and draws a portion of wire rope 3E of drogue tail 3D and parachute assembly 3H into mooring bed 4. Soil resistance on parachute 3J causes weak link 3P to part to leave expendable parachute assembly 3H behind at surface 5 of mooring bed 4. As embedment proceeds, instrumentation 2 measures, computes, encodes, and transmits roll and pitch of anchor 3, load and direction of load in pin 3A of shackle 3B of anchor 3, burial trajectory data, and pressure at attachment point A to transponder 10. Transponder 10 relays these data, together with pressure data at transponder 10, acoustically to transponder 12A on carriage 19 and transponder 12A sends the data electrically to transceiver 9 for recording and displaying on a monitor screen on vessel 8. The pressure measured at transponder 10 enables the height of transponder 10 above surface 5 of mooring bed 4 to be displayed throughout the installation procedure and confirms that first transponder 10 has been maintained clear of mooring bed 4 as planned. The pressure measured at attachment point A on anchor 3 enables the depth of point A below surface 5 to be computed to provide confirmation and continuous calibration of the depth of burial of attachment point A derived from the before-mentioned burial trajectory data.

When the monitored data confirms that attachment point A on anchor 3 has reached a prescribed target depth, vessel 8 applies a prescribed proof load tension in mooring line 7 for 15 to 30 minutes. Propeller thrust is now decreased and work-wire 7C is heaved back onto winch drum 8B until shackle 7H between work-wire 7C and synthetic rope 7B arrives over stern roller 8A and onto deck 8C adjacent to the shark's jaws mentioned previously. Work-wire 7C is then disconnected from synthetic rope 7B and replaced with a chain tail attached to a buoy (not shown) in a disconnect-and-change-over procedure. Tugger winch wires and pulleys are then used to push the upper end of synthetic rope 7B and the attached buoy overboard. The buoy serves to support the mooring system while awaiting final hook-up to a floating structure to be moored and is arranged to hold synthetic rope 7B and a portion of forerunner 7A clear of surface 5 of mooring bed 4 so that transponder 10 on mounting 16 continues to be maintained free from fouling by mooring bed soil.

The first and third arrangements will now be readily understood as variations relating to supporting the upper transponder (12 and 12D) of the anchor data communication system.

In the first arrangement, omni-directional transponder 12 is connected by wet-mateable mechanical and electrical connector 13D to armoured cable 13A stored on slip-ring equipped winch drum 18 on anchor handling vessel 8 and is lowered overboard, with emission beam axis 12E vertical, until separated sufficiently from vessel 8 so that acoustic noise issuing therefrom is acceptably attenuated. Thereafter, deployment and installation of anchor 3 is performed largely as described for the second arrangement but with transponder 12 at one end of the acoustic signal path instead of transponder 12A.

In the third arrangement, acoustic/wireless link 21 comprising clump weight 25, tether line 24, and spar buoy 21A with transceiver 9A attached thereto and connected to transponder 12D are deployed overboard from anchor handling vessel 8, using similar deck handling procedures as described for the second arrangement, before commencing deployment and installation of anchor 3. Clump weight 25 is located on surface 5 of mooring bed 4 in a position between the planned final positions of transponder 10 and vessel 8 on completion of installation of anchor 3 so that transponder 12D is in the installed heading of forerunner 7A. Deployment and installation of anchor 3 and buoying off of synthetic rope 7B is then performed substantially as described for the second arrangement but without fitting transponder 12A and carriage 19 to work-wire 7C. Data from anchor 3 is communicated acoustically between transponders 10 and 12D, then wirelessly between transceivers 9A and 9.

Assembly and deployment of anchor data communication system 1 incorporating the before-mentioned modification (FIG. 8) follows procedures similar to those already described. In this case, it is not necessary to fit parachute assembly 3H to anchor 3 and the final installed position of transponder 10 on mounting 16 is at surface 5 of mooring bed 4 some 80 m aft of buried anchor 3. Transponder 10 is constrained in the heading of vessel 8 by wire rope 3E of drogue tail 3D. As before, a mooring line catenary calculation enables angle α to be selected in mounting 16 to optimise signal transmission between transponder 10 and transponder 12 or 12A.

On completion of installation of a multiplicity of anchors and mooring lines, including anchor data communication systems, and hook-up to a floating structure, any of the three arrangements for deploying an upper or second transponder 12, 12A, or 12D may be employed for continuous monitoring of the multiple anchor system. A single omni-directional upper transponder may be sufficient to trigger and monitor data from each of the anchors in turn using suitable anchor identification coding and may be supported on a carriage 19 on one of the mooring lines to be kept clear of drill strings, risers, and the like, at the floating structure being moored. Indefinite long term data acquisition is achieved by periodically replacing the power supply and or batteries of each of transponders 10 using a suitably equipped remotely operated underwater vehicle deployed from a vessel such as anchor handling vessel 8.

It will be appreciated that variations are possible within the scope of the invention.

For example: one or both of transponders 10 and 12A may be omni-directional; and where forerunner 7A comprises a wire rope, first conductors 11 may be located along the bottom of helical grooves present between adjacent external strands of the wire rope. The adjacent external strands would shield first conductors 11 from being crushed on the cylindrical surface of stern roller 8A of anchor handling vessel 8. Alternatively, first conductors 11 may be incorporated wholly within such a forerunner. For such variations, mounting 16 would be clamped rotationally as well as axially to forerunner 7A to avoid a resulting necessity to provide a slip-ring device in the electrical path between instrumentation 2 and transponder 10. The angle α of mounting 16 (FIG. 4) would then be set at 0° in conjunction with using a transponder 10 having an acoustic beam conical divergence included angle of 90° to permit communication despite any turns that might occur in forerunner 7A causing transponder 10 to rotate about forerunner 7A. The installation procedure would also be modified to maintain a positive angle of inclination of forerunner 7A at all times during installation of anchor 3 to ensure that rotationally clamped mounting 16 and transponder 10 are kept clear of mooring bed soil.

Further, transponders 10 and 12A may each be equipped with an underwater antenna for very low frequency electromagnetic communication in body of water 6 instead of acoustic communication where a low bit rate for digital data transmission is acceptable.

It will be evident that the location of transponder 10 on forerunner 7A exposes transponder 10 to considerable operational hazards. However, the safeguards described herein overcome such hazards and so enable the realization of the benefits conferred by locating transponder 10 on forerunner 7A. These hazards can be avoided by locating transponder 10 on tail drogue 3D (FIG. 8) while preserving the advantage conferred by heading constraint.

The invention claimed is:

1. An anchor data communication system (1), for communicating data at least one way between instrumentation (2) attached to an anchor (3) for burial in a mooring bed (4) under a body of water (6) and a transceiver (9) carried by a structure (8, 21A) floating on said body of water (6), said anchor (3) being attached to a mooring line (7) comprising a lower portion (7A) and an upper portion (7C) for connection to a structure (8) floating on said body of water, comprises a first transponder (10) connected by first conductor means (11) to said instrumentation (2), and a second transponder (12, 12A, 12D) communicating at least partially via second conductor means (13) with said transceiver (9), wherein at least one transponder (10, 12A) is attached to a line member (7) connected to said anchor (3) such that an axis (10A, 12B) of an emission beam (10B, 12C) of said at least one transponder (10, 12A) is substantially constrained in heading by said line member (7), said first transponder (10) being attached to said lower portion (7A) of said mooring line (7) at a spacing distance (d) from a point of attachment (A) of said mooring line (7) to said anchor (3), measured along said mooring line (7), such as to be maintained in a position at or above a surface (5) of said mooring bed (4).

2. An anchor data communication system (1), according to claim 1, wherein said spacing distance (d) is between 1 and 7 times the depth of penetration (Z) of said point of attachment (A) below said surface (5) of said mooring bed (4).

3. An anchor data communication system (1), according to claim 2, wherein said at least one transponder (10, 12A) is directional in having a directional axis (10A, 12B) along which substantially maximum signal strength occurs in a directional emission beam (10B, 12C) emitted therefrom.

4. An anchor data communication system (1), according to claim 3, wherein said directional emission beam (10B, 12C) has a conical divergence included angle (β, δ) which does not exceed 90°, and further preferably does not exceed 60°.

5. An anchor data communication system (1), according to claim 4, wherein said at least one transponder (10, 12A) is attached to said line member (7, 3D) such that said directional axis (10A, 12B) forms an acute angle (α, γ) with an adjacent portion (7A, 7C, 3E) of said line member (7, 3D).

6. An anchor data communication system (1), according to claim 5, wherein said acute angle (α, γ) is in the range 0° to 60°.

7. An anchor data communication system (1), for communicating data at least one way between instrumentation (2) attached to an anchor (3) for burial in a mooring bed (4) under a body of water (6) and a transceiver (9) carried by a structure (8, 21A) floating on said body of water (6), said anchor (3) being attached to a mooring line (7) comprising a lower portion (7A) and an upper portion (7C) for connection to a structure (8) floating on said body of water, comprises a first transponder (10) connected by first conductor means (11) to said instrumentation (2), and a second transponder (12, 12A, 12D) communicating at least partially via second conductor means (13) with said transceiver (9), wherein at least one transponder (10, 12A) is attached to a line member (7, 3D) connected to said anchor (3) such that an axis (10A, 12B) of an emission beam (10B, 12C) of said at least one transponder (10, 12A) is substantially constrained in heading by said line member (7, 3D), said first transponder (10) being attached to a line member (3D) comprising a drogue tail (3D) connected to said anchor (3) and including a drag member (3F) for dragging behind said anchor (3) in contact with a surface (5) of a mooring bed (4) to produce a force for constraining the heading of said anchor (3) in the direction of dragging prior to embedment of said anchor (3).

8. An anchor data communication system (1), according to claim 7, wherein said axis (10A, 12B) has the heading of said line member (7, 3D).

9. An anchor data communication system (1), according to claim 7, wherein said drogue tail (3D) is of sufficient length to allow said drag member (3F) to remain on said surface (5) when said anchor (3) is buried there-below.

10. An anchor data communication system (1), according to claim 9, wherein said first transponder (10) is attached to said drogue tail (3D) in the vicinity of said drag member (3F) whereby said first transponder (10) is maintained at or above said surface (5).

11. An anchor data communication system (1), according to claim 7, wherein said first transponder (10) and said second transponder (12A) is attached to said line member (7, 3D) by rotatable attachment means (16, 19) whereby said at least one transponder (10, 12A) can rotate about said line member (7, 3D).

12. An anchor data communication system (1), according to claim 11, wherein said rotatable attachment means (16, 19) is equipped with at least one of buoyancy means (16N) and counter-weight ballast means (19L) offset from said line member (7, 3D) whereby a force is produced to rotate said rotatable attachment means (16, 19) such as to maintain said at least one transponder (10, 12A) above an adjacent point on said line member (7, 3D).

13. An anchor data communication system (1), according to claim 7, wherein the position of said second transponder (12A) on said mooring line (7) is separated from said structure (8) sufficiently to obviate acoustic signal swamping at said second transponder (12A) of signals from said first transponder (10) by acoustic noise emanating from said structure (8).

14. An anchor data communication system (1), according to claim 13, wherein said second transponder (12A) is movable along said mooring line (7) to reduce separation from said first transponder (10) and to reduce attenuation of signal received therefrom.

15. An anchor data communication system (1), according to claim 7, wherein at least one of said first and second conductor means (11, 13) comprises an electrical conductor, an optical conductor, or a fluid conductor.

16. An anchor data communication system (1), according to claims 7, wherein said fluid conductor (14) is filled with water and closed at an upper end (14A) by an elastically deformable pressure-transmitting element (14B) and at a lower end by a pressure transducer (15) whereby total water column pressure at said pressure transducer (15), when buried in said mooring bed (4), is measurable uninfluenced by pore pressure in adjacent soil of said mooring bed (4).

17. An anchor data communication system (1), according to claim 7 wherein said instrumentation (2) on said anchor (3) includes a chargeable element, such as a supercapacitor, which is chargeable by a power source (10C) of said first transponder (10) whereby said chargeable element acts to provide an interim local power supply for sustaining said instrumentation (2) during underwater replacement of said power source (10C) or said first transponder (10).

18. An anchor data communication system (1), according to claim 17, wherein at least one of said transponder (10, 12, 12A, 12D) and said transceiver (9, 9A) is a device adapted for transmitting and receiving data-containing signals at least one of electrically, electromagnetically, optically, and acoustically.

19. An anchor data communication system (1), according to claim 7 wherein said first transponder (10) includes a pressure transducer to enable monitoring of depth of immersion and height of said first transponder (10) above said surface (5) of said mooring bed (4).

20. An anchor data communication system (1), according to claim 7 wherein said anchor (3) is provided with a trailable resistance member (3H), such as an underwater parachute (3J), arranged to produce a drag resistance force when dragged in a body of water (6).

\* \* \* \* \*